United States Patent [19]

Quay et al.

[11] Patent Number: 5,115,071
[45] Date of Patent: May 19, 1992

[54] HIGH PERFORMANCE POLYURETHANE COATING COMPOSITIONS AND PROCESSES FOR MAKING SAME

[75] Inventors: Jeffrey R. Quay, Kutztown; Sherri L. Bassner, Landsdale; Thomas M. Santosusso, Macungie, all of Pa.

[73] Assignee: Air Products and Chemicals, Inc., Allentown, Pa.

[21] Appl. No.: 682,790

[22] Filed: Apr. 9, 1991

[51] Int. Cl.⁵ .............................................. C08G 18/10
[52] U.S. Cl. ....................................... 528/59; 528/61; 528/65; 528/76; 528/77; 528/81; 528/82
[58] Field of Search ...................... 528/59, 61, 65, 76, 528/77, 81, 82

[56] References Cited

U.S. PATENT DOCUMENTS

| | | | |
|---|---|---|---|
| 3,218,348 | 11/1965 | McElrey et al. | 260/471 |
| 3,384,624 | 5/1968 | Heiss | 528/76 |
| 3,726,825 | 4/1973 | Woodward et al. | 260/29.2 |
| 4,182,825 | 1/1980 | Jackle | 528/44 |
| 4,413,111 | 11/1983 | Markusch | 528/59 |
| 4,786,703 | 11/1988 | Starner et al. | 528/63 |
| 4,888,442 | 12/1989 | Dunlap et al. | 560/352 |

FOREIGN PATENT DOCUMENTS 1101410  1/1968  United Kingdom .

Primary Examiner—Maurice J. Welsh
Assistant Examiner—Rachel Johnson
Attorney, Agent, or Firm—Russell L. Brewer; James C. Simmons; William F. Marsh

[57] ABSTRACT

This invention relates to polyurethane coatings formed from prepolymers made by reacting polyisocyanates with long chain polyols having an average functionality of greater than 2. The resulting prepolymers have equivalent weights greater than about 250 grams per equivalent and preferably greater than about 350 grams per equivalent. An excess of polyisocyanate is reacted with the polyol component at an equivalent ratio of greater than 4:1 equivalents isocyanate per equivalent of polyol. Excess polyisocyanate is then removed from the prepolymer.

The resulting polyurethane prepolymers are chain extended with compounds having active hydrogen atoms such as water, amines or short chain polyhydroxy compounds, e.g., diols to form the resulting coatings.

31 Claims, No Drawings

HIGH PERFORMANCE POLYURETHANE COATING COMPOSITIONS AND PROCESSES FOR MAKING SAME

FIELD OF THE INVENTION

This invention relates to polyurethane prepolymers formed by the reaction of a polyisocyanate with a polyol, processes for making such polyurethane prepolymers suitable for forming polyurethane coatings, and to polyurethane coatings made from the prepolymers.

BACKGROUND OF THE INVENTION

Polyurethanes are widely known and often involve the initial preparation of a prepolymer formed by the reaction of an aliphatic or aromatic polyisocyanate with a long chain polyol. The resulting prepolymer formed by such reaction can then be reacted with a chain extending agent such as water, a diamine or short chain diol to form the final polyurethane polymer. The polyurethanes formed by this basic reaction have multiple applications, such as adhesives, elastomers, coatings, and sealants. Properties of the resulting polyurethane are controlled by the proper selection of isocyanate, long chain polyol and chain extending agent. Each application requires different processing parameters such as appropriate pot life, viscosity, etc. Each application also has its own specific requirements for end use properties, for example: elastomers may require excellent tensile strength, elongation, tear strength, etc.; adhesives may require excellent tack, peel and shear strength; and flexible and nonflexible coatings may require excellent solvent resistance, scratch resistance and abrasion resistance. Many of these requirements may be met by proper design of the prepolymer.

Polyurethane systems for coatings are formulated to give good solvent resistance, tensile properties and scratch resistance. Polyurethane coatings are also formulated for good flexibility coupled with toughness, excellent electrical properties and good abrasion resistance. However, the prepolymers which formed the basis of such systems were generally of relatively high molecular weight and gave coating solutions of relatively low non-volatiles content (<50% by weight).

Due to recent environmental concerns about solvent emissions there is pressure to develop formulations with higher non-volatile content but which retain good physical properties. The general approach has been to lower the molecular weight of the polyurethane prepolymers, thus lowering the viscosity of the resin and allowing an increase in the non-volatiles of the formulation. Such formulations could be cured into high molecular weight polymers by various mechanisms known in the art such as curing with atmospheric moisture or with a second component.

Representative patents which show various polyurethane prepolymers and various end products produced by reaction of a diamine or a diol with the resulting polyurethane prepolymers are as follows:

British Patent 1,101,410 discloses polyurethane prepolymer elastomers having low viscosity and extended pot life which are prepared by reacting a diisocyanate with a diol wherein the diisocyanate is present in a mole ratio of 1:1 and preferably 1.1:1.7. Although up to 7 moles diisocyanate per mole of diol can be used, its use, at that level, is discouraged because any excess diisocyanate used in preparing the polyurethane prepolymer must be removed in order to control final properties.

U.S. Pat. No. 3,218,348 discloses a process for preparing polyurethane polyisocyanates which have high molecular weight and do not crystallize from a solution on standing. The polyisocyanates are reacted with a trihydric alcohol such as trimethylolpropane in an organic solvent followed by addition of a dihydric alcohol such as 1,3-butyleneglycol.

U.S. Pat. No. 3,384,624 discloses a process for preparing polyurethane prepolymers free of unreacted polyisocyanate. The prepolymers, which can be used for preparing coatings, castings, paints and lacquers, are prepared by reacting toluenediisocyanate with an active hydrogen containing compound, e.g. a long chain diol and then contacting the prepolymer with a phenolic material in an amount sufficient to remove excess unreacted polyisocyanate. Mole ratios of polyisocyanate to diol range from about 1.3 to 2.1. The resulting blocked polyurethane prepolymer can then be unblocked and chain extended with an organic diamine or polyol.

U.S. Pat. No. 3,726,825 discloses polyurethane coatings having moisture vapor barrier properties as well as high gloss, abrasion resistance, etc. required of such coatings. The linear thermoplastic polyurethane resins are prepared by reacting a non-halogenated organic diisocyanate with an organic dihydroxy compound and from about 0.1 to 0.9 moles of neopentylglycol. The resulting polyurethane prepolymer then is cured under anhydrous conditions.

U.S. Pat. No. 4,786,703 discloses various polyurethane prepolymers suited for producing polyurethane/urea elastomers, the prepolymers being formed by reacting an excess of toluenediisocyanate with a long chain diol. Unreacted toluenediisocyanate then is stripped from the resulting prepolymer. Utilization of high mole ratios, e.g. 4–12:1 toluenediisocyanate per mole of diol results in a prepolymer with very low content of higher oligomers. When the prepolymer is cured with an aromatic diamine, property enhancements of the resulting polyurethane elastomer are achieved.

U.S. Pat. No. 4,182,825 and U.S. Pat. No. 4,888,442 disclose the removal of unreacted isocyanate monomers from polyurethane prepolymers to enhance properties. Low hysteresis is reported. The disadvantage of such prepolymers is that the removal of the polyisocyanate from a conventional prepolymer increases the viscosity of the prepolymer. As a result the coating must be formulated at lower non-volatiles content.

SUMMARY OF THE INVENTION

The invention relates to improved polyurethane prepolymers for coating systems, to a process for producing such polyurethane prepolymers and to such coating systems. In the basic process, a polyisocyanate is reacted with a polyol component comprising a long chain diol and then the unreacted polyisocyanate is removed from the reaction medium. The improvement for producing polyisocyanate prepolymers which are capable of producing polyurethane/urea coatings having superior properties is achieved by utilizing a polyhydroxyl compound or a blend of polyhydroxyl compounds having an average functionality of greater than 2 and an average equivalent weight of 100 to 2000 grams per equivalent as the polyol component to produce a prepolymer with an equivalent weight of 250 to 2000 grams per equivalent and preferably 350 to 1000 grams per equivalent.

There are several advantages associated with the polyurethane coatings and the processes for producing coatings of this invention and these include:

an ability to generate polyurethane prepolymers which are easily processable in coating formulations due to their low viscosity at processing temperatures;

an ability to use polyurethane prepolymers which are easily handled because of their less toxic nature due to reduced volatile diisocyanate monomer content;

an ability to prepare higher non-volatile content coatings formulations due to the low viscosity of these prepolymers at processing temperatures; and, an ability to synthesize polyurethane coatings having improved physical properties such as enhanced abrasion resistance, solvent and scratch resistance and tensile strength.

DETAILED DESCRIPTION OF THE INVENTION

Polyurethane prepolymers of this invention exhibit both low potential for worker exposure to volatile isocyanates and good processability. These prepolymers also enable the formulation of high non-volatile content flexible and nonflexible coating systems and impart improved physical properties such as tensile strength and scratch and solvent resistance. They also allow formulation of coating systems which satisfy Government regulations requiring reduced volatile organic content (VOC) emissions and ameliorate concern over the utilization of isocyanate prepolymers due to the toxicity of any diisocyanate monomer normally found in conventional polyurethane coating formulations. Prior art methods have been limited in that one can only lower the molecular weight of the prepolymers only so far before the viscosity starts to increase because of end group interactions. Also many conventionally prepared prior art prepolymers contain relatively high amounts of unreacted isocyanate and do not address the need for a less toxic system. They also have not provided the necessary scratch and solvent resistance when the formulations are adjusted for reduced viscosity.

This invention involves the preparation of a polyisocyanate prepolymer with an equivalent weight between 250 and 2000 (preferably between 350 and 1000) grams per equivalent. The prepolymers are formed by reacting a polyisocyanate with a polyol having an average functionality greater than 2 (generally in the range of from 2.2 to 4) and average equivalent weight generally in the range of 200 to 1000 g/eq. An excess of polyisocyanate (functionality at least 2) is reacted with the polyol component at an equivalent ratio of greater than 4:1 equivalents polyisocyanate per equivalent polyol. The unreacted isocyanate monomer is removed from the prepolymer by distillation or other treatment to a concentration of less than 1% and preferably less than 0.5% of unreacted diisocyanate.

Conventional long chain polyols may be used, e.g., di- or multi-functional alkylene ether polyols such as poly (tetramethylene oxide) polyols; poly(propylene oxide) polyols; and poly(ethylene oxide) polyols in prepolymers. Polyester polyols such as those formed by the reaction of aliphatic or aromatic dicarboxylic acids with glycols can also be used as the polyol component for preparing the polyurethane prepolymers. Specific examples of acids for forming polyester polyols include isophthalic, teraphthalic, and adipic acids. Specific glycols include ethylene glycol, diethylene glycol, butanediol, propylene glycol and so forth.

Polyols having a functionality greater than 2 are blended with the long chain diol to produce a polyol component for reaction with the polyisocyanate in an amount such that the average functionality is greater than 2 and preferably between 2.2 and 4 and the average equivalent weight is between 100 and 2000. Representative polyols having functionality greater than 2 include trimethylolpropane (TMP), glycerol, pentaerythritol, dipentaerythritol, trihydroxybutane, sucrose, and alkoxylated adducts of the above.

Representative polyisocyanates that can be used for producing the prepolymers include aromatic diisocyanates such as toluenediisocyanate, tetramethylxylenediisocyanate, and diphenylmethanediisocyanate; cycloaliphatic polyisocyanates such as cyclohexanediisocyanate, isophoronediisocyanate, and dicyclohexylmethanediisocyanate; and linear aliphatic isocyanates such as hexamethylenediisocyanate. Adducts and prepolymers of the above and any mixture of stereo or positional isomers as well as virtually any di- or multi-functional isocyanate can be used. Toluenediisocyanate is a preferred polyisocyanate.

The polyisocyanate prepolymers are prepared by reacting the multi-functional polyol composition with a large (greater than 4 to 1 and typically from 6-10:1) equivalent excess of the multifunctional polyisocyanate to polyol. The utilization of a high equivalent ratio of polyisocyanate to polyol reduces the viscosity of the prepolymer by reducing higher oligomer content. The resulting prepolymers also have low concentrations of higher oligomers, i.e., the prepolymer essentially comprises two equivalents polyisocyanate per equivalent of polyol because of the high ratio of isocyanate to polyol in the original reaction mixture. Excess polyisocyanate is removed to levels less than 1% preferably less than 0.5% by weight in the prepolymer. Temperatures for effecting reaction between the polyisocyanate and polyol are conventional, e.g., 0°-120° C. Care should be exercised during removal of the excess polyisocyanate so that allophanates, oligomers and other byproducts are not formed.

Coating formulation is carried out in a conventional manner, e.g., one-part (moisture cure) or multi-part formulations. Coating formulations may also be made from prepolymers of this invention which have been reacted with a blocking agent. This results in a blocked-isocyanate prepolymer which can be blended with a curing agent to make a one part system which is thermally curable.

Typical one part coating formulations consist of the polyurethane prepolymer (resin), solvents, catalysts and other additives. Two part formulations also include a chain extender which is generally mixed with the prepolymer just prior to applying the coating formulation to the substrate.

Typical solvents include but are not limited to xylene, toluene, methylethylketone, methylamylketone, ethylacetate, tetrahydrofuran, and n-butylacetate. Typical catalysts include carboxylic acids and their metal salts, and tertiary amines. Typical chain extending agents include aromatic amines such as toluenediamine, diethyltoluenediamine, methyl bis(orthochloroaniline), alicyclicdiamines such as methylene di(cyclohexylamine) and methyl cyclohexanediamine, and short chain polyols and precursors including butanediol, ethylene glycol, propylene glycol, tripropylene glycol, glycerol, and water. Numerous amine and polyol chain extending agents can be used.

Although not intending to be bound by theory, the advantages of the prepolymers of this invention for use in preparing coatings having improved processing and physical properties can be explained in part by the following:

A. The removal of the unreacted isocyanate reduces the potential toxicity of the prepolymer and coating formulation making it easier to handle;

B. Removal of the unreacted isocyanate from a conventional type prepolymer, e.g., one formed by reacting a polyisocyanate with a polyol in a 2:1 equivalent ratio, greatly increases the viscosity of the system as the unreacted isocyanate acts as a solvent for the prepolymer. Therefore, a conventional prepolymer that is treated to remove unreacted isocyanate must be formulated at a lower non-volatiles content to enable it to be processed, thus raising VOC;

C. The low oligomer content of the prepolymer achieved through reaction of the polyisocyanate with the polyol at a high equivalent ratio greatly reduces the viscosity of the prepolymer and allows the coating to be formulated at higher non-volatiles contents, typically 70 to 90% by weight or higher. It also affects structure providing for enhanced solvent and scratch resistance at comparable polyfunctional polyol levels. Using an excess of isocyanate without removing the unreacted isocyanate monomer reduces the viscosity over a conventional prepolymer but results in coatings that are often too brittle for use. In addition, the high isocyanate monomer content would raise serious concerns over safety, health, environmental and regulatory issues;

D. The use of multifunctional (i.e. functionality greater than 2) polyols and diisocyanates improves the solvent resistance of the resulting polyurethane formed from the prepolymer. In a conventional prepolymer, the formation of oligomers from multifunctional building blocks rapidly increases the functionality and viscosity of the prepolymer and can lead to gelation;

E. Prepolymers formed with polyols with equivalent weights greater than 250 and preferably greater than 350 enable the preparation of high solids coatings with good physical properties. Use of "pseudo-prepolymers" of equivalent weight less than 250 result in very brittle coatings with poor properties. In this latter case, a second component must be added to increase the molecular weight in order to get good performance. This has been done by reacting the "pseudo-prepolymer" with a polyol to increase the equivalent weight but which it also greatly increases the viscosity of the prepolymer relative to ones of this invention; and, The combination of low oligomer content and low unreacted isocyanate content results in a cured polyurethane or polyurethane/urea coating which has a uniform hard segment and generally a unique morphology compared to those normally obtained. The polyurethane prepolymers of this invention have lower viscosities than those of prior art and thus can be formulated at higher non-volatile contents with a reduction in the volatile organic content (VOC). The formulated coatings build critical viscosity more slowly and enable a longer working life with approximately equivalent through cure time. They have lower potential toxicity due to the reduction in diisocyanate monomer content. Besides improved processability, coatings from these prepolymers have improved physical properties especially tensile strength and scratch and solvent resistance.

The following examples are intended to represent various embodiments and are not intended to restrict the scope thereof.

EXAMPLE 1

Polyurethane Prepolymers

NCO/OH Ratio of 10:1—Functionality 2.5

1742 g (20 eq.) 50/50 2,4-toluenediisocyanate (24TDI)/2,6-toluene diisocyanate (26TDI) were charged into a three liter jacketed reaction kettle equipped with a mechanical stirrer, thermowell/thermocouple, $N_2$ purge, addition funnel, and a condenser. The reactor was maintained at 50° C. Then, a mixture of 590.1 g (1.53 eq.) of 145.9 hydroxyl No. (OH#) poly(propylene oxide)diol (Niax PPG-725, Union Carbide) and 57.95 g (0.46 eq.) 450 OH# poly(propylene oxide) tetrol (PEP-550 BASF) was added dropwise over two hours. After addition was complete, the clear liquid was stirred overnight at 50° C.

At the conclusion of the reaction the unreacted 24TDI and 26TDI were subsequently removed using a thin film still operating under the following conditions:

| Vacuum | 1-3 Torr |
|---|---|
| Temperature | 110-150° C. |
| Feed Rate | 100-200 g/hr. |

The final product was a slightly yellow viscous liquid at room temperature. The prepolymer properties are given in Table 1.

COMPARATIVE EXAMPLE 2

2:1 Mole Ratio—Functionality 2.5

174.9 g (2.0 eq.) 80/20 24TDI/26TDI was added to a 1 liter 3 neck flask equipped with a thermocouple, heating mantel, $N_2$ purge, electric stirrer, addition funnel and condenser. A mixture of 295.1 g (0.77 eq.) 145.9 OH# poly(propylene oxide)diol (Niax PPG-725, Union Carbide) and 29.1 g (0.23 eq.) 450 OH# poly(propylene oxide)tetrol (PEP-550, BASF) were added to the TDI at 75° C. The reaction mixture was stirred for six hours at 75° to 100° C. When the reaction was completed, the product was a very viscous clear liquid at room temperature. Table 1 provides the prepolymer properties.

TABLE 1

| Example | % Residual Isocyanate | % NCO | Eq. Wt. Prepolymer | Eq. Wt. Polyol | Functionality Polyol - Ave. |
|---|---|---|---|---|---|
| 1 | 0.03 | 8.3 | 506 | 325 | 2.5 |
| 2 | 3.40 | 8.01 | 525 | 325 | 2.5 |

EXAMPLE 3

NCO/OH Ratio of 10:1—Functionality 3.9

A prepolymer was prepared according to Example 1 with 2654.4 g (30.5 eq.) of 50/50 24TDI/26TDI, 200.5 g (0.4 eq.) 109.5 OH# poly(propylene oxide)diol (Niax PPG-1025, Union Carbide) and 324.5 g (2.6 eq.) 450 OH# poly(propylene oxide)tetrol (PEP-550, BASF). The final product was a clear yellow glass at room temperature. When the polymer was dissolved at 70% solids in xylene, it was a pourable liquid. The prepolymer properties are given in Table 2. (See Example 6).

COMPARATIVE EXAMPLE 4

NCO/OH Ratio of 2:1—Functionality 3.9

Prepolymer was prepared according to Example 3 with 261.3 g (3.0 eq.) 80/20 24TDI/26TDI, 100.2 g (0.2 eq.) 109.5 OH# poly(propylene oxide)diol (Niax PPG-1025, Union Carbide) and 162.3 g (1.3 eq.) 450 OH# poly(propylene oxide) tetrol (PEP-550, BASF). The prepolymer was a clear yellow glass at room temperature. When the prepolymer was dissolved at 70% solids in xylene it was a viscous pourable liquid. Table 2 provides the results. (See Example 6).

EXAMPLE 5

NCO/OH Ratio of 4:1—Functionality 3.9

High Unreacted NCO

A prepolymer was prepared according to Example 3 with 522.6 g (6 eq.) 80/20 24TDI/26TDI, 100.2 g (0.2 eq.) 109.5 OH# poly(propylene oxide)diol (Niax PPG-1025, Union Carbide) and 162.3 g (1.3 eq.) 450 OH# (PEP-550, BASF). The prepolymer was a viscous clear yellow liquid at room temperature. Table 2 provides the results. (See Example 6).

EXAMPLE 6

NCO/OH Ratio of 8:1—Functionality 2:1 Difunctional Polyol

Prepolymer was prepared according to Example 2 with 2090.0 g (24.0 eq.) 50/50 24TDI/26TDI, 291.7 g (0.6 eq.) 109.5 OH# poly(propylene oxide)diol (Niax PPG-1025, Union Carbide) and 233.3 g (2.4 eq.) tripropyleneglycol. The unreacted 24TDI and 26TDI were removed as in Ex. 2. The final product is a clear yellow glass at room temperature. When dissolved in xylene at 70% solids it is a pourable liquid. The prepolymer is representative of the prepolymers described in U.S. Pat. No. 4,786,703. Table 2 provides the results.

TABLE 2

| Example | % Residual Isocyanate | % NCO | Eq. Wt. Prepolymer | Eq. Wt. Polyol | Functionality Polyol - Ave. |
|---|---|---|---|---|---|
| 3 | 0.08 | 11.8 | 356 | 175 | 3.9 |
| 4 | 5.91 | 11.61 | 362 | 175 | 3.9 |
| 5 | 34.3 | 24.1 | 174 | 175 | 3.9 |
| 6 | 0.08 | 11.9 | 353 | 175 | 2.0 |

TABLE 3

| Prepolymer | Resin (%) | Xylene (%) | DABCO-120 (%) |
|---|---|---|---|
| Ex. 1 | 85.0 | 14.9 | 0.1 |
| Ex. 2 | 85.0 | 14.9 | 0.1 |

TABLE 4

| Prepolymer | Resin (%) | Xylene (%) | DABCO-120 (%) |
|---|---|---|---|
| Ex. 3 | 58.8 | 41.1 | 0.1 |
| Ex. 4 | 58.8 | 41.1 | 0.1 |
| Ex. 5 | 58.8 | 41.1 | 0.1 |
| Ex. 6 | 58.8 | 41.1 | 0.1 |

EXAMPLE 8

Viscosity of Coatings Formulations

Viscosity measurements were carried out for Examples 1-6 on a Brookfield Viscometer Model DV-II RVT using a SCA4-21 spindle at 20 rpm at 25° C. The shear rate is 18.6 sec-1. Tables 5 and 6 provide results for Examples 1-2 and 3-5 respectively.

TABLE 5

| Example | Viscosity (CPS) |
|---|---|
| 1 | 510 |
| 2 | 1110 |

TABLE 6

| Example | Viscosity (CPS) |
|---|---|
| 3 | 23 |
| 4 | 310 |
| 5 | 110 |

At equivalent % non-volatiles, the coatings prepared from prepolymers made according to this invention (Ex. 1 and 3) have much lower viscosities and thus better processability than those made by a conventional process using a 2:1 mole ratio as represented in Ex. 2 and 4 respectively. Even when a significant excess of TDI is used and is not removed, as in Example 5, the viscosity is still higher. The excess isocyanate, while a good solvent for the prepolymer, poses an extreme health risk. The prepolymers of this invention can therefore be formulated at a higher non-volatiles level to meet a viscosity specification and will have both a lower VOC and a lower potential for worker exposure to toxic isocyanate monomer.

EXAMPLE 7

Coatings Formulations

The prepolymer resins of Examples 1-6 were formulated into moisture cured coatings by dissolving the resin in solvent (xylene) to give a workable viscosity and adding DABCO* 120 tin catalyst to speed the cure. The formulations used for Examples 1 and 2 are given in Table 3 and the formulations used for Examples 3-6 are given in Table 4.

EXAMPLE 9

Preparation and Physical Properties of Coatings

Drawdowns of the coating formulations using the prepolymers of (Ex. 1-6) were made with a draw-down bar according to ASTM D609 and D823. About 10 g of the formulated resin was poured onto a phosphated, cold-rolled steel panel and drawn down to 6 mils wet with a Gardner draw down bar. The panels were then dried in a controlled temperature and humidity (CTH) room (75° F. and 50% rel. humidity). Film cure is achieved by reaction with ambient moisture. Dry times were obtained with a Gardner circular dry time recorder.

Coatings for tensile testing were drawn down on aluminum panels. The cured films aged for two weeks at CTH and were removed from the panels and cut into standard dog-bone test samples. Tensile testing of the coating formulations using the prepolymers of Examples 1–6 were conducted according to ASTM D2370 on an Instron Model 1122, set at a 0.2 in/min pull rate. Pencil hardness was determined according to ASTM D3363. Hoffman scratch resistance was determined by a procedure similar to D2197. Table 6 provides the results for Examples 1 and 2 and Table 7 provides the results for Examples 3–6.

TABLE 6

| Example | Tack Free Time (min.) | Hardness Pencil | Break Tensile (psi) | Elongation (%) | Scratch Resist. (g) | Solvent Rubs |
|---|---|---|---|---|---|---|
| 1 | 13.75 | 8H | 3400 | 300 | 1800 | 100+ |
| 2 | 10.25 | 8H | 2100 | 160 | 1500 | 100+ |

TABLE 7

| Example | Tack Free Time (min.) | Hardness Pencil | Break Tensile (psi) | Elongation (%) | Scratch Resist. (g) | Solvent Rubs |
|---|---|---|---|---|---|---|
| 3 | 16.25 | >8H | 9500 | 2.7 | 1300 | 100+ |
| 4 | 6.75 | 6H | 7300 | 3.1 | 400 | 100+ |
| 5 | 5.25 | 2H* | —* | —* | <1 | 27* |
| 6 | 12.0 | 6H | 8300 | 3.5 | 500 | 43 |

*coating was very brittle; films could not be removed from aluminum panels for tensile testing.

Tables 6 and 7 show the tack free times for the coatings. The coatings formulations based on this invention (Ex. 1 and 3) have longer tack free times, an indirect measure of working life, than conventional analogues processed at the same solids level. The tack free time of the coating can be easily reduced through changes in catalysis and/or solvent mixture. The longer working life of the prepolymers of this invention thus gives the coating formulator a greater processing latitude.

The coatings based on this invention (Ex. 1 and 3) and their conventional analogues (Ex. 2 and 4) have similar pencil hardnesses. However, when an excess of isocyanate was used without removing it (Ex. 5), the coating was very brittle and thus had a low pencil hardness due to cracking during testing. The brittleness of Ex. 5 also caused relatively poor results in the MEK rub test and scratch resistance test. Ex. 6, which was the difunctional analogue to Ex. 3, had a slightly lower hardness and much poorer solvent resistance due to decreased crosslink density in the film.

The tensile properties of coatings Ex. 1 and 3 were also superior to their conventional counterparts, Ex. 2 and 4. The high equivalent weight material Ex. 1 not only had a 60% improvement in tensile strength as compared to Ex. 2, but also had a 90% improvement in % elongation. This is unusual since, tensile strength and % elongation typically have an inverse relationship. The coating derived from the higher functionality prepolymer, Ex. 3, has a 30% improvement in tensile strength with approximately the same elongation as the conventional counterpart, Ex. 4.

The coatings based on this invention also have improved scratch resistance. Example 3 shows a better than 200% improvement over its conventional analogue (Ex. 4) while Ex. 1 has a 20% improvement over Ex. 2. Example 3 also shows a 160% improvement over its difunctional analog, Ex. 6. Examples 1 and 3 show good solvent resistance as measured by MEK solvent rubs. Ex. 5 shows poor resistance, apparently because of its very brittle nature due to pressure of excess diisocyanate monomer. Example 6 also shows poor solvent resistance due to decreased crosslink density, indicating the importance of functionalities greater than 2 for prepolymers used in these applications. In conclusion, the data with respect to solvent and to scratch resistance show that those properties are generally improved at the same levels of polyol with functionality greater than 2 than conventionally prepared systems.

SUMMARY

Polyurethane prepolymers of this invention have better processability, and coatings based on those prepolymers regardless of the specialized application, e.g. flexible and non-flexible coatings have better physical properties than either their conventional counterparts or those prepolymers which do not have functionality greater than 2. The lower viscosity of the prepolymers allows the resins to be formulated at higher solids and reduced VOC. The formulated coatings also have a longer working life than their conventional counterparts at an equivalent non-volatiles level. The coatings have better tensile properties than their conventional analogues while maintaining good solvent resistance and pencil hardness. Scratch resistance is also improved. The prepolymers of this invention also lead to coatings with significantly better solvent resistance than those based on conventional prepolymers.

What is claimed is:

1. In a process for producing a polyurethane coating wherein a polyisocyanate is reacted with a long chain polyol component to produce a polyurethane prepolymer and the polyurethane prepolymer is chain extended with water, an amine or short chain diol, the improvement which comprises:

utilizing as said prepolymer, a prepolymer having an equivalent weight from 250 to 2000 grams per equivalent which is formed by reacting a polyisocyanate with a long chain polyol component having an average functionality of greater than 2.0 at a ratio of from 4 to 20 equivalents of polyisocyanate per equivalent of polyol component and removing the unreacted polyisocyanate component to a concentration of less than about 1% by weight.

2. The process of claim 1 wherein the polyisocyanate is an aromatic polyisocyanate and said functionality of the polyol component is from 2.2 to 4.

3. The process of claim 2 wherein the long chain polyol component is a polyether or polyester polyol.

4. The process of claim 3 wherein the aromatic polyisocyanate is toluenediisocyanate.

5. The process of claim 4 wherein the polyol is a blend of a long chain polyether or polyester polyol and a short chain multifunctional polyol.

6. The process of claim 5 wherein the long chain polyol is a polyether polyol selected from the group consisting of poly(ethylene oxide)polyols, poly(propylene oxide)polyols and poly(butylene oxide) polyols or a combination of the same.

7. The process of claim 6 wherein the short chain multifunctional polyol is selected from the group consisting of trimethylolpropane, glycerol, sucrose, pentaerythritol, alkoxylated versions of these polyols and mixtures of the same.

8. The process of claim 7 wherein the equivalent ratio of diisocyanate to polyol is from 4 to 20.

9. The process of claim 1 wherein the polyisocyanate is an aliphatic polyisocyanate.

10. The process of claim 3 wherein the long chain polyol is a polyether or polyester polyol.

11. The process of claim 10 wherein the aliphatic polyisocyanate is isophoronediisocyanate.

12. A polyisocyanate end capped prepolymer suited for producing polyurethane coatings which comprises a reaction product of a polyisocyanate component and a long chain polyol component having an average hydroxyl functionality greater than 2.0, said prepolymer having an equivalent weight from about 250 to 2000 grams per equivalent, an unreacted monomeric polyisocyanate content of less than about 1% by weight, and a molar concentration of higher oligomers of less than 10%.

13. The polyisocyanate endcapped prepolymer of claim 12 wherein the polyisocyanate is an aromatic polyisocyanate and said functionality of the polyol component is from 2.2 to 4.

14. The polyisocyanate endcapped prepolymer of claim 13 wherein the long chain polyol is a polyether or polyester polyol.

15. The polyisocyanate endcapped prepolymer of claim 14 wherein the aromatic diisocyanate is toluenediisocyanate.

16. The polyisocyanate endcapped prepolymer of claim 15 wherein the long chain polyol component is a blend of a polyether or polyester polyol and a short chain multifunctional polyol.

17. The polyisocyanate endcapped prepolymer of claim 16 wherein the long chain polyol is a polyether polyol selected from the group consisting of poly(ethylene oxide)polyols, poly(propylene oxide)polyols, and poly(butylene oxide)polyols or a combination of the same.

18. The polyisocyanate endcapped prepolymer of claim 12 wherein the multifunctional polyol is selected from the group consisting of trimethylolpropane, glycerol, sucrose, or pentaerythritol, alkoxylated versions of these polyols and mixtures of the same.

19. The polyisocyanate endcapped prepolymer of claim 16 wherein the equivalent ratio of diisocyanate to polyol used to make the prepolymer is from 4 to 20.

20. The polyisocyanate endcapped prepolymer of claim 12 wherein the polyisocyanate is an aliphatic polyisocyanate.

21. The polyisocyanate endcapped prepolymer of claim 20 wherein the aliphatic diisocyanate is isophoronediisocyanate.

22. In a polyurethane coating composition formed by the reaction of a polyurethane prepolymer formed by the reaction of a polyisocyanate and a long chain polyol and a chain extending agent, the improvement of which comprises utilizing the prepolymer of claim 12 as said prepolymer.

23. The polyurethane composition of claim 22 wherein the polyisocyanate used in forming the prepolymer is an aromatic polyisocyanate.

24. The polyurethane composition of claim 23 wherein the polyol used in forming the prepolymer is a polyether or polyester polyol.

25. The polyurethane composition of claim 24 wherein the aromatic polyisocyanate is toluenediisocyanate.

26. The polyurethane composition of claim 25 wherein the polyol is a blend of a polyether or polyester polyol and a short chain multifunctional polyol.

27. The polyurethane composition of claim 26 wherein the long chain polyol is a polyether polyol selected from the group consisting of poly(ethylene oxide)polyols, poly(propylene oxide)polyols and poly(butylene oxide)polyols and combinations of the same.

28. The polyurethane composition of claim 27 wherein the short chain multifunctional polyol is selected from the group consisting of trimethylolpropane, glycerol, sucrose, or pentaerythritol, alkoxylated versions of these polyols and mixtures of the same.

29. The polyurethane composition of claim 25 wherein the equivalent ratio of diisocyanate to polyol used to make the prepolymer is from 4 to 20.

30. The polyurethane composition of claim 22 wherein the polyisocyanate used in forming the prepolymer is an aliphatic polyisocyanate.

31. The polyurethane composition of claim 30 wherein the aliphatic polyisocyanate is isophoronediisocyanate.

* * * * *